United States Patent [19]

Migrin

[11] Patent Number: 4,599,501

[45] Date of Patent: Jul. 8, 1986

[54] SWITCH ACTUATING MECHANISM HAVING RESILIENT MEANS FOR DISPLACEMENT TRANSMISSION

[75] Inventor: Robert S. Migrin, Dearborn, Mich.

[73] Assignee: United Technologies Automotive, Inc., Dearborn, Mich.

[21] Appl. No.: 656,824

[22] Filed: Oct. 2, 1984

[51] Int. Cl.$^4$ ............................................. H01H 21/22
[52] U.S. Cl. ................................... 200/156; 200/6 B; 200/153 L; 200/260
[58] Field of Search .................. 200/4, 5 R, 6 R, 6 B, 200/11 J, 11 D, 11 TW, 260, 280, 156, 153 K, 291, 292, 303, 318, 321, 330, 331, 61.54, 153 L, 153 LA, 153 LB

[56] References Cited

U.S. PATENT DOCUMENTS

| | | | |
|---|---|---|---|
| 2,663,780 | 12/1953 | Hept | 200/260 |
| 2,675,448 | 4/1954 | Knudson | 200/260 |
| 2,905,962 | 9/1959 | Ziegler | 200/159 R |
| 2,993,098 | 7/1961 | Canaday | 200/51.03 |
| 3,375,337 | 3/1968 | Barrett | 200/156 |
| 3,524,952 | 8/1970 | Anderson | 200/68.2 |
| 3,654,413 | 4/1972 | Jordon | 200/156 |
| 3,668,353 | 6/1972 | Raab | 200/153 K |
| 3,852,554 | 12/1974 | Heide | 200/156 |

FOREIGN PATENT DOCUMENTS 2323969 11/1974 Fed. Rep. of Germany ...... 200/243

Primary Examiner—G. P. Tolin
Attorney, Agent, or Firm—Stephen A. Schneeberger

[57] ABSTRACT

A switch, as for a windshield wiper, has a housing, a carriage rotatable in the housing in opposite directions from a first position to respective second and third positions, one or more electrical contacts mounted on and moving with the carriage, a conductive contact surface fixed in the housing for engagement by the contacts moving with the carriage, a primary actuation member which is manually actuatable from a first to a second position and may control a windshield washer, a drive member carried by the primary actuation member along a path, a resilient reaction member affixed to the carriage and extending into the path of the drive member for engagement therewith and displacement thereby, and wherein the carriage is displaced from the first to the second position by the displacement of the reaction member. The reaction member is the cantilevered arm of a torsion spring. When the carriage is manually actuated through its first position toward its third position, the cantilevered arm of the torsion spring engages a stop member, such as the drive member of the primary actuating member, and yields to allow displacement to the third position but provides a return bias to the first position when the manual actuating force is released.

14 Claims, 14 Drawing Figures

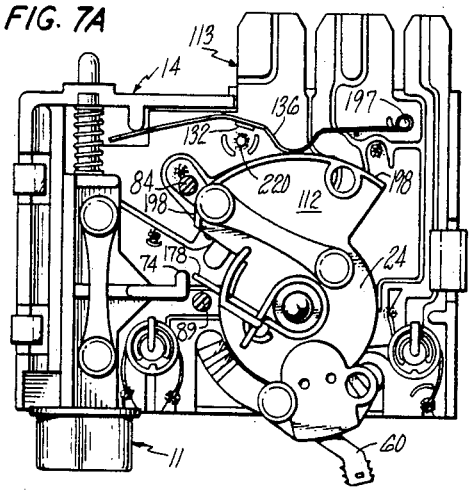
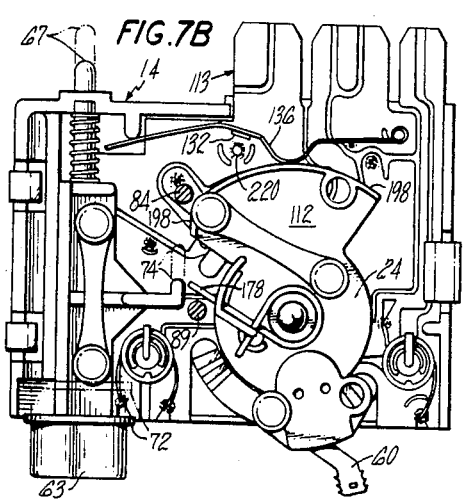
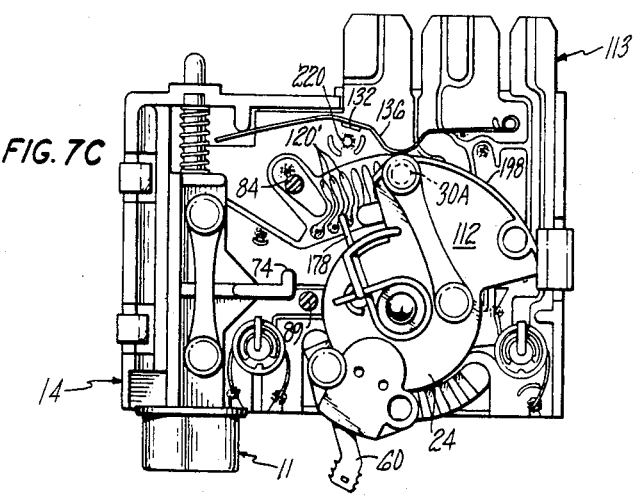
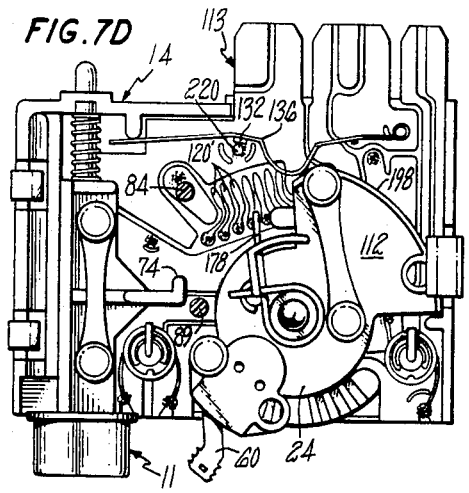
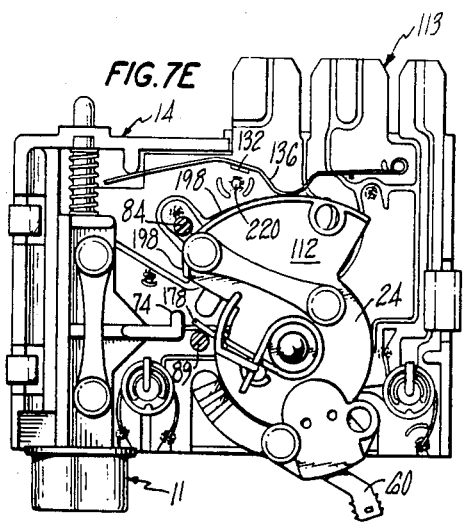

4,599,501

SWITCH ACTUATING MECHANISM HAVING RESILIENT MEANS FOR DISPLACEMENT TRANSMISSION

TECHNICAL FIELD

The present invention relates to an actuating mechanism for use in a switch, and more particularly to an actuating mechanism for use in dual function electrical switches, as for instance, an automotive washer/wiper switch.

BACKGROUND ART

Electrical switches have existed in which manual actuation of an initial member in a switch results secondarily in the actuation of a contact-bearing switch element to make or break an electrical circuit. Such switch actuation mechanisms are particularly useful where the directly or initially actuated member serves as a first switch and the secondarily actuated member serves as a second switch. One such switch actuation arrangement which is relatively common is found in the switch mechanisms for controlling operation of both the wiper and the washer units of an automotive vehicle, as typified by U.S. Pat. Nos. 2,905,962, 2,993,098 and 3,542,952.

In U.S. Pat. No. 2,905,962 a helical cam surface is formed on the end of a rotatable and reciprocable rod, and the cam surface coacts with a fixed base and a rotatable switch contact such that movement of the rod in one direction rotates the switch contact whereas movement of the rod in the opposite direction does not rotate the switch contact. That switch is mechanically relatively complex.

The U.S. Pat. No. 2,993,098 discloses a switch mechanism having a first biased washer switch actuator which also acts to displace a wiper switch carriage from a first to a second position via a drive arrangement which prevents reverse actuation of the carriage from its first position.

The U.S. Pat. No. 3,524,952 discloses a switch mechanism which includes a rocker-type wiper switch actuator pivotaly supported for actuation between various wiper operating positions and a washer switch actuator slidably supported by the wiper switch actuator for linear movement relative thereto along an axis extending normal to the pivot axis of the wiper switch actuator. While such arrangement is relatively compact, it does not particularly lend itself to applications where various electrical contact surfaces are disposed on a circuit board.

Another form of switch, disclosed in U.S. Pat. No. 3,668,353, utilizes an initial pivoting actuator to transmit a driving force to a slidable carriage on which are mounted electrical contacts. A torsion spring arrangement associated with the input actuator extends into engagement with the slidable carriage for returning the carriage to a neutral position when the input actuating force is released.

DISCLOSURE OF INVENTION

It is an object of the present invention to provide an improved electrical switch of the type in which a force applied to an input actuator is transferred to a movable carriage. It is a further object to provide such an electrical switch in which the carriage is movable to operating positions in opposite directions from a neutral position. It is a further object to provide such an electrical switch in which the input actuator also serves directly to provide an electrical switching function. It is an even further object to provide such an electrical switch particularly suited for utilization with electrical contact surfaces disposed on a circuit board.

In accordance with the invention there is provided an electrical switch having a housing, a carriage movable in the housing between first and second positions, one or more electrical contacts mounted on and moving with the carriage, a conductive contact surface fixed in the housing for engagement by the contacts moving with the carriage, a primary actuation member which is manually actuatable from a first to a second position, a drive member carried by the primary actuation member along a path, a resilient reaction member affixed to the carriage and extending into the path of the drive member for engagement therewith and displacement thereby, and the carriage is displaced from the first to the second position by the displacement of the reaction member. The carriage is rotatably mounted for rotation in opposite directions from a first position to respective second and third positions. The reaction member is the cantilevered arm of a torsion spring. The primary actuation member is biased to its first position. The carriage includes provision for separate direct manual actuating input to each of its positions. When the carriage is directly manually actuated through its first position toward its third position, the cantilevered arm of the torsion spring engages a stop member and yields to allow displacement to the third position but provides a return bias to the first position when the manual actuating force is released. The drive member associated with the primary actuating member may serve as that stop member when in its respective first position. The rotatable carriage and electrical contacts associated therewith are operative to control the operation of a windshield wiper motor. The primary actuating member may also be provided with electrical contacts and serves to control operation of an associated washer/-pump motor.

BRIEF DESCRIPTION OF THE DRAWINGS

FIG. 4B illustrates, in phantom, the washer switch in its actuated position and the wiper switch thereby actuated to its "low" speed position;

FIG. 4C illustrates the wiper switch in its "high" speed position;

FIG. 4D illustrates the washer switch actuated to its "mist" position;

FIGS. 7A-7E are plan views of the switch of FIG. 5, with the cover removed, showing the washer and wiper switches in various operating positions and wherein FIG. 7A illustrates the switches in their "off" position;

FIG. 7B illustrates, in phantom, the washer switch actuated without also actuating the wiper switch;

FIG. 7C illustrates the wiper switch positioned in a range of delay operating positions;

FIG. 7D illustrates the wiper switch in its "high" speed position; and

FIG. 7E illustrates the wiper switch actuated to its "mist" position.

BEST MODE FOR CARRYING OUT THE INVENTION

Figure 1:
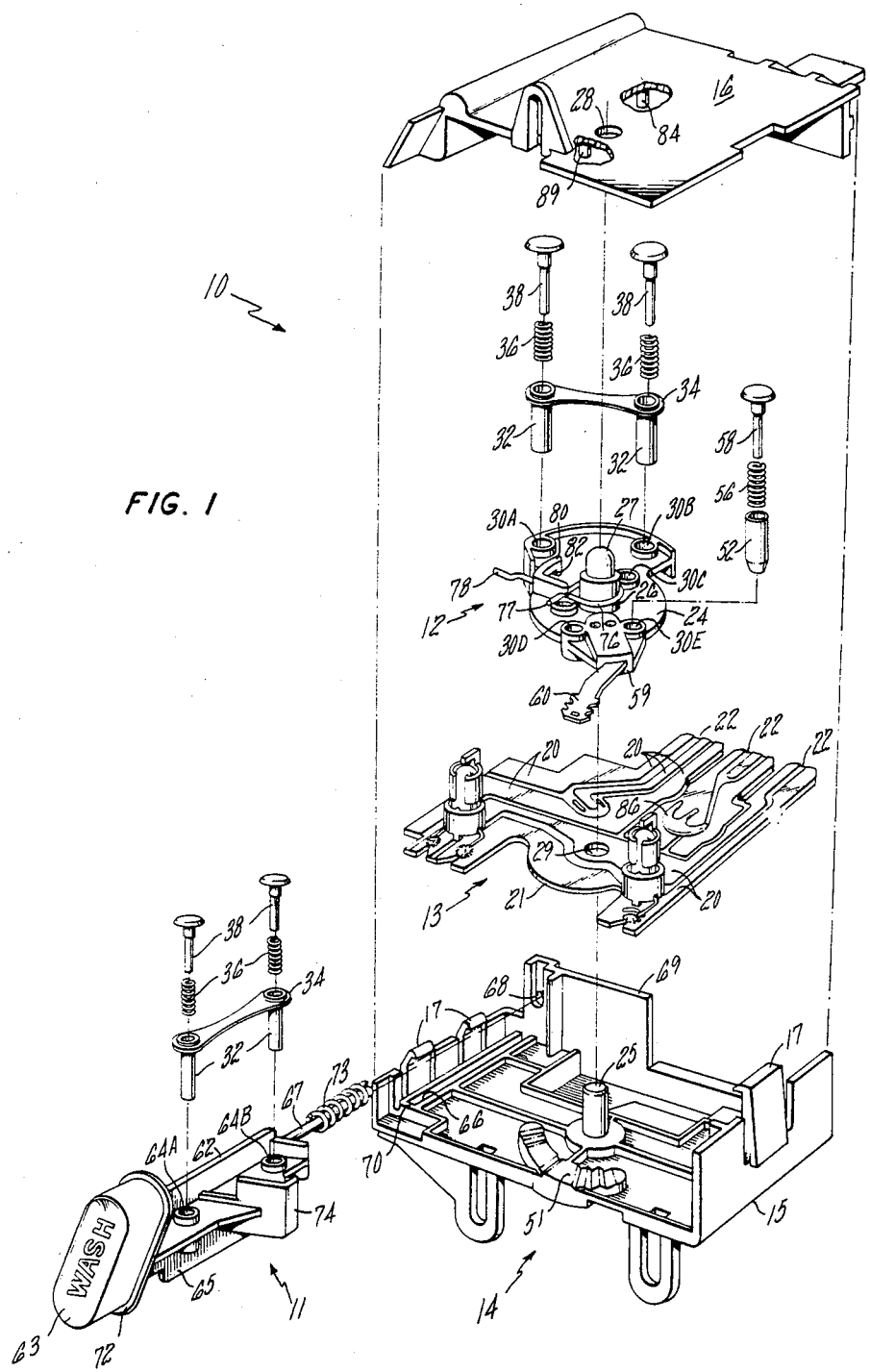
FIG. 1 is an exploded view of a washer/wiper switch.

Referring to FIG. 1 there is illustrated in exploded form, a washer/wiper switch assembly 10. The switch assembly 10 includes a washer switch carriage assembly 11 and a wiper switch carriage assembly 12 each mounted for displacement relative to a circuit board assembly 13 and collectively positioned and mounted within a housing 14 comprised of a base portion 15 and a cover portion 16. For the purposes of the following description, the washer/wiper switch 10 will be presumed to have a particular spatial orientation in which the base portion 15 is lowermost, the cover 16 is uppermost and manual activation occurs at a forward end, however it will be appreciated that such orientation is only to facilitate description of the interrelationship of the component parts and other spatial attitudes are possible The housing 14 is preferably formed of molded plastic, with the base portion 15 serving as the principal mounting surface for the circuit board assembly 13, the washer switch carriage assembly 11, and the wiper switch carriage assembly 12. The housing base portion 15 is designed to cooperatively engage with cover 16, as by snap locks 17 to provide the housing closure 14 for the switch elements. The housing 14 is of relatively rigid construction so as to provide a substantially-rigid geometrical configuration, for reasons to be appreciated more fully hereinafter.

The circuit board assembly 13 comprises a selected pattern of conductive contact surfaces, generally designated 20 and disposed, as by printing or etching or other suitable manner, on a substantially rigid substrate 21, as for instance a glass-epoxy material. The various separate parts 20 of the conductive contact pattern lead to one or more terminal tabs 22 formed at the rear edge of the circuit board for connection in a known manner via an electrical connector (not shown) with a respective washer pump motor, (not shown) and a two-speed wiper motor (not shown). The switching action of switch 10 is provided by displacement of one or both of the washer switch assembly 11 and the wiper switch assembly 12 to respective selected positions by which selected conductive pattern parts 20 are electrically connected to one another by an electrical contact arrangement carried by and forming part of the respective washer switch carriage assembly 11 or wiper switch carriage assembly 12.

Referring to the wiper switch carriage assembly 12, a carriage such as a molded plastic rotor 24 is adapted to rotate about a vertical axis defined by pintle 25 extending upwardly from and formed integrally with the housing base portion 15. The rotor 24 includes an axially-extending cylindrical hub 26 extending both upwardly and downwardly from the rotor for rotatingly encircling the pintle 25. The upper portion of rotor hub 26 is closed and domed to provide a secondary pintle 27 for rotatable insertion through an opening 28 in the cover 16. The circuit board assembly 13 is supported in direct engagement with the housing base portion 15, with pintle 25 extending upwardly through an opening 29 in the circuit board assembly. The hub 26 of rotor 24 is rotatably disposed on pintle 25, and the axial extent of hub 26 below rotor 24 is such that the lower end-face of that hub is in sliding bearing engagement with an upper surface of the circuit board assembly 13. The rotor 24 includes five circular openings 30a, 30b, 30c, 30d and 30e, respectively, extending axially therethrough at various locations radially spaced from the hub 26. All of the openings 30a–e are of the same diameter, with openings 30a–c being positioned generally rearwardly of hub 26 and openings 30d and 30e being positioned generally forwardly of the hub in the various operating orientations of rotor 24. In the illustrated embodiment, much of the body of rotor 24 is relatively thin axially, however, the openings 30a–e are each positioned in portions of the hub having a significant axial extent, i.e., about 0.35 inch.

Two of the three rearward openings 30a–c in rotor 24 serve to house a respective pair of electrical contact members 32. Contact members 32 are joined by an electrically conductive retainer 34 to provide the requisite electrical connection therebetween. The pair of conductive contact members 32 are housed in openings 30a and 30b, respectively, with opening 30c being unused in the present embodiment but finding use in an alternate embodiment to be hereinafter described.

Each contact member 32 is tubular and is open at its upper end for receiving a spring 36 and plunger 38, and is closed at its lower end to provide a seat or shoulder 39 for the lower end of spring 36 and to provide the surface which is in conductive contact with a conductive pattern part 20 on the circuit board substrate 21. Each contact member 32 is part of a contact mechanism or assembly which also includes the spring 36 and the plunger 38. The contact member 32 is so sized in the radial direction as to ensure a free-sliding relation with the rotor 24. Contact spring 36 is a coil spring sized for seated insertion within the contact member 32 and adapted for compression between shoulder 39 of contact member 32 and the plunger 38. The plunger 38 may be of plastic or the like and includes a head portion 40 and a pin 42 depending from the head portion. More specifically, the plunger head portion 40 includes an uppermost portion having a diameter greater than the outside diameter of the contact member 32 and a neck portion depending therefrom of lesser diameter than the inside diameter of member 32. The pin 42 depends from and is of lesser diameter than the neck portion, forming a downwardly facing shoulder 43 at the transition. Pin 42 is axially, slideably inserted within the spring 36 and its position is stop-limited by engagement of the upper end of the spring with the shoulder 43.

The upper surface of head 40 of plunger 38 preferably has a low coefficient of friction and is intended to be in substantially continuous engagement with a reaction surface which urges the plunger 38 downwardly against the bias of spring 36. Such downward force applied to the plunger 38 serves to load the spring 36 and accordingly apply a downward force to the contact member 32 to ensure good electrical contact with the contact pattern parts 20 of circuit board assembly 13. Conveniently, the reaction surface is provided by the inner or undersurface 45 of the cover 16 along the track described by plunger head 40 as rotor 24 rotates. The reaction surface 45 might alternatively be considered as a camming surface and, in the preferred embodiment, is substantially flat and is maintained at a substantially constant spacing from the contact pattern parts 20 of the circuit assembly 13. However, as illustrated by broken lines in a part of FIG. 3, the cover 16' might have a camming or reaction surface 45' which is not planar, and thereby varies the spacing with the circuit assembly 13 such that the downward force applied to the contact member 32 is accordingly varied.

With the aforementioned arrangement of a contact mechanism, a predetermined, and for that matter variable, spring force may be applied to the contact member 32 for urging it into good electrical contact with contact pattern part 20. Moreover, because the contact member 32 is free to slide within the wiper switch carriage assembly 12 and the reaction forces are applied substantially only on the fixed components such as cover 16 and the circuit assembly 13 and housing base portion 15, there is no off-center axial force applied to rotor 24 which might cause it to cock or bind.

Figure 2:
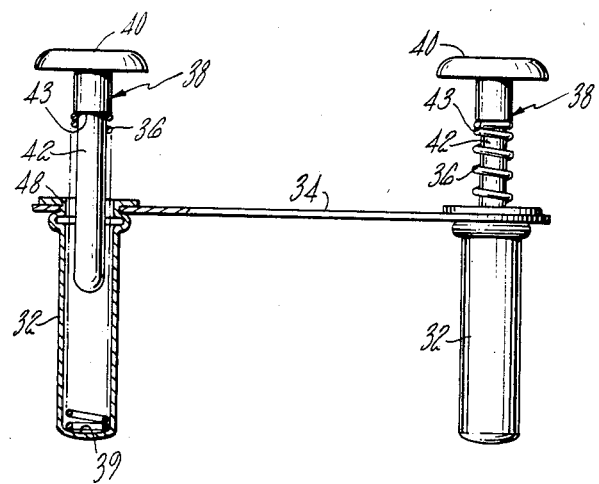
FIG. 2 is a view, partly in section, of the contact arrangement employed in the switch of FIG. 1.
Figure 3:
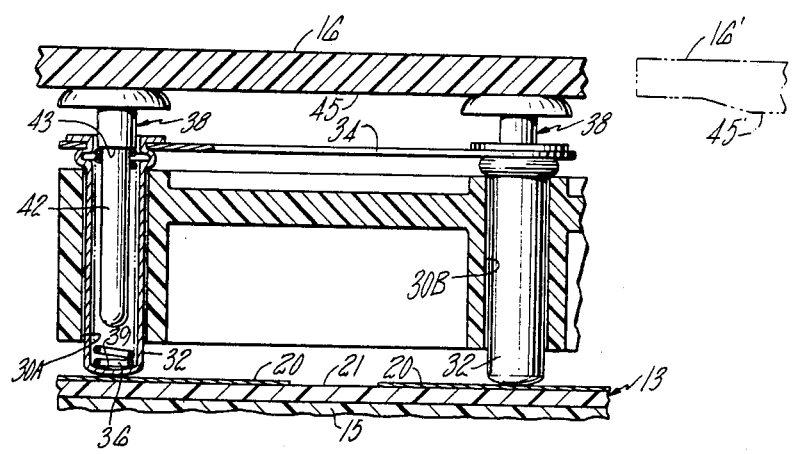
FIG. 3 is a further view of the contact arrangement of FIG. 2 operatively positioned in the switch assembly of FIG. 1.

To provide electrical connection between a pair of spaced and insulated contact pattern parts 20 on the printed circuit assembly 13, it will normally be necessary to have two contact members 32 in contact with respective contact pattern parts 20 and electrically connected by means such as retainer 34. Of course, instances may exist in which more than two contact members are joined electrically in common. It is preferable that each of the commonly-connected contact members 32 be capable of at least some degree of axial displacement relative to one another to accommodate any irregularities or camming contours in the upper or lower reaction surfaces contacted. Such independent axial flexibility minimizes the possibility of one contact member 32 becomming skewed or cocking within its respective opening in the rotor 24. To afford such independent axial motion, the conductive retainer 34 connecting a pair of contact members 32 is structured such that it is resiliently yieldable in a direction commensurate with axial motion of the contact 32 but is relatively rigid to forces acting in a direction transverse to the axial direction. Specifically, retainer 34 is a 0.010 inch thick oblong copper member having a length of approximately one inch and a width at its narrowest of approximately 0.13 inch. A pair of circular openings 48 are formed through retainer 34 near its opposite ends. The upper ends of respective contact members 32 extend through respective openings 48 and are rigidly joined thereto as by a rivet-type of deforming of the upper end of the contact member 32 as illustrated in FIGS. 2 and 3. In those instances in which transverse or radial rigidity or stability of the relative positionings of contact members 32 is not particularly necessary, the retainer 34 might take an alternate form, as for instance, that of a conductive wire which may be bonded to the respective contact members.

One of the two openings 30d and 30e is used to slideably house a detenting element, such as detent member 52 which is biased into detenting engagement with a slotted detent contact surface 51 formed on the housing base portion 15. The detent member 52 is generally similar in structure to an electrical contact member 32, however, it typically is of a rigid nonconductive plastic material, and its lowermost end which is adapted for detenting engagement with the detent contact surface 51 may be somewhat more tapered than that of an electrical contact member 32 and its upper end is not connected with any retaining member. As in the instance of the electrical contact members 32, the detenting member 52 is urged into detenting contact with detent surface 51 by means of a ciled compression spring 56 and a force-transmitting plunger 58. The plunger 58 may be substantially identical with the plungers 38 and the interrelationship of detent member 52, spring 56 and plunger 58 is substantially identical with that of contact member 32, spring 36 and plunger 38. Depending upon the detenting forces required, the spring 56 may have a greater or lesser spring force than that of spring 36. A reaction force is delivered to plunger 58 via the undersurface 45 of housing cover 16.

A forwardly-extending appendage 59 on rotor 24 rigidly mounts a metal stem or actuator arm 60 to which a thumb button (not shown) may be affixed for applying a manual rotating force to rotor 24.

Referring again to FIG. 1, the washer switch carriage assembly 11 includes a manually actuated, linearly displaceable actuator or carriage 62 having a finger button 63 suitably affixed to a mounting flange 72 at the forward end thereof and including spaced openings 64a and 64b extending vertically therethrough for mounting respective electrical contacts 32. The washer carriage 62 is formed of rigid molded plastic and includes a longitudinally-extending guide bar 65 depending therefrom for reciprocable sliding displacement within a complementary guide slot 66 molded in housing base portion 15 toward one side thereof. The guide slot 66 extends in a fore and aft direction for reciprocation of carriage 62 in that direction. Washer carriage 62 additionally includes a guide pin 67 extending rearwardly from a rear surface thereof for sliding insertion through an opening 68 in the rear wall 69 of housing base portion 15. The opening 68 is sized and positioned to provide alignment and support for the rear end of carriage 62 at rest and during reciprocation.

A transversely extending ridge or wall 70 is formed in the housing base portion 15 at the forward end of guide slot 66 to define a stop member which limits displacement of the washer carriage 62 in each direction. Specifically, the forward end of carriage guide bar 65 contacts the rear face of stop wall 70 to define a first operating limit and the inner or rear face of mounting flange 72, which is spaced from guide bar 65, engages the forward face of stop wall 70 to define a second operating limit position. A coil spring 73 encircles the guide pin 67 intermediate the rear face of carriage 62 and is in compression for biasing carriage 62 to its outer limit position. The electrical contacts 32 associated with the washer switch carriage assembly 11 are the same as for the wiper switch assembly 12, and are connected by a retainer 34 and are urged into electrical engagement with the circuit board assembly 13 by respective springs 36 and respective plungers 38 as previously described.

The openings 64a and 64b in washer carriage 62 are positioned to the right or inwardly of the guide rail 65 so as to be in alignment with selected contact pattern parts 20 along the left side margin of the circuit board assembly 13. The patterning and positioning of the various contact pattern parts 20 associated with the contacts 32 of washer switch assembly 11 and with contacts 32 of wiper switch assembly 12 is such that retainer 34 in each instance may be of the same length to further facilitate interchangeability of parts.

A rigid appendage 74 is integrally formed with and extends transversely inward from washer carriage 62 to provide a drive member for transferring an actuating force from the washer switch assembly 11 to the wiper switch assembly 12 via a reaction member, such as torsion spring 76 affixed to rotor 24. The torsion spring 76 encircles rotor hub 26 and includes a short, radially extending tail or anchor portion 77 and a longer radially extending cantilevered arm portion 78. A spring mounting structure 80 formed on the upper surface of hub 24 includes a notch at one end which serves to anchor the tail 77 of the spring and further includes a circumferentially arcuate slot 82 extending radially therethrough for extension therethrough of the cantilevered spring arm 78. The relative configurations of the torsion spring 76 and the mounting slot 82 are such that the spring includes a slight preload which urges cantilevered arm 78 relatively counterclockwise to the limit of slot 82 as viewed from above in FIG. 1.

Figure 4A:
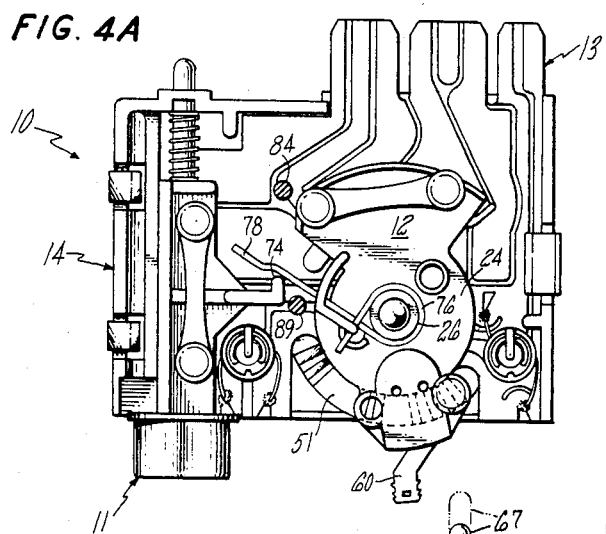
FIGS. 4A-4D are plan views of the switch of FIG. 1 with the cover removed and showing the respective washer and wiper switches in differing positions with FIG. 4A showing both switches in an "off" position.

When washer switch assembly 11 is manually actuated rearwardly against the bias of spring 73 to its limit position, its associated drive member 74 will correspondingly be displaced along a linear path. The length and elevation of the cantilevered arm 78 of torsion spring 76 are such as to place the spring in the displacement path of the wash actuator drive member 74 for certain limited angular orientations of the wiper rotor 24. Specifically, when the rotor 24 is at a detented angular position commensurate with an "off" electrical condition for the wiper motor as depicted in FIG. 4A, the spring arm 78 will pass rearwardly of drive member 74 with some small spacing therebetween.

Figure 4B:
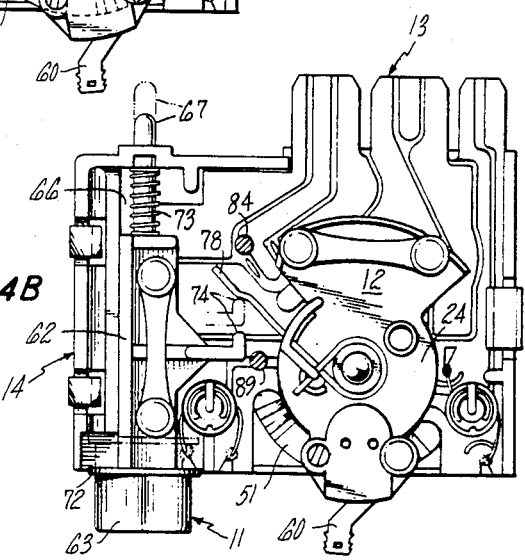

When the wash actuator carriage 62 is actuated rearwardly to its limit to energize the washer pump motor, as shown in phantom in FIG. 4B, the drive member 74 engages spring arm 78 and displaces it rearwardly also. Such rearward displacement of spring arm 78 is in a torsion-increasing direction on rotor 24 and is sufficient to overcome any detenting force of force detent member 52, thus resulting in clockwise rotation of rotor 24 to the position illustrated in FIG. 4B. The precise rotor orientation illustrated in FIG. 4B is determined principally by the angular positioning of one of the detent notches appearing on the detent contact surface 51 of the housing base portion 15. The displacement range of drive member 74 on washer actuator carriage 62 is such that, via torsion spring 76 it rotates rotor 24 just to the detented position illustrated in FIG. 4B and not beyond. In such position, electrical connection is made with the "low" speed winding of the wiper motor and is accordingly designated the "low" speed position.

Figure 4C:
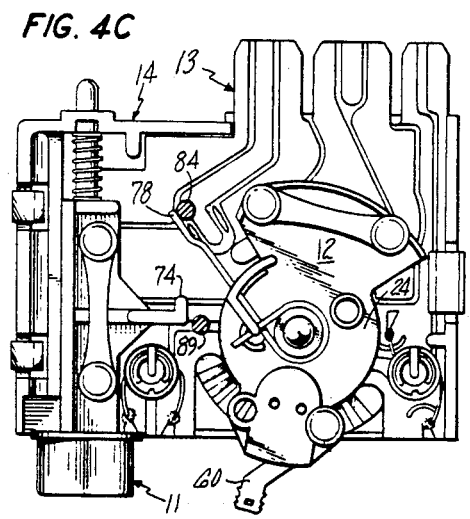

Referring to FIG. 4C, the wash actuator switch 11 is shown as having been released and returned to its "off" position and the wiper rotor 24 has been manually rotated clockwise, via stem 60, to the angular position which effects "high" speed operation of the wiper motor. The precise angular location of the "high" speed position of rotor 24 is determined by limiting engagement of spring arm 78 with a stop rod 84 molded with and depending from the underside of cover 16 and additionally by detenting engagement of detent member 52 with an appropriately-positioned notch in the detenting contact surface 51.

Figure 4D:
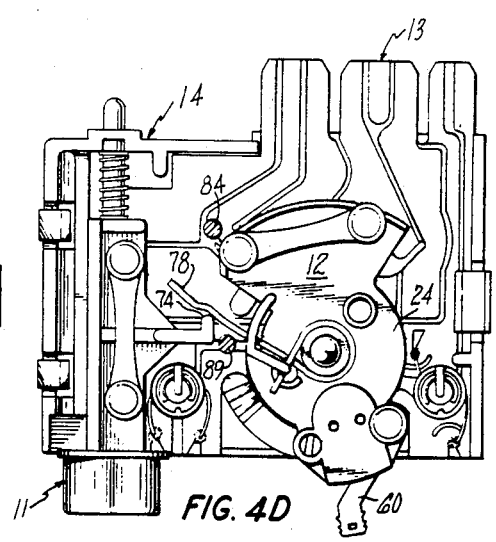

The wiper rotor 24 may also be manually rotated counterclockwise, via the stem 60, from any one of the aforementioned positions to a counterclockwise extreme represented in FIG. 4D and being designated as a "mist" position. The "mist" position is electrically the same as the "low" speed position of wiper operation and is intended for several sweeps of a wiper so long as the operator maintains the wiper switch assembly rotated to the "mist" position. Specifically, when rotor 24 is rotated counterclockwise from the "off" position (FIG. 4A), the spring arm 78 immediately engages the drive member 74 of wash carriage 62. However, because the wash carriage is at its "off" limit position, the drive member 74 now effectively serves also as a stop member to prevent further angular displacement of spring arm 78 relative to that member and to the housing 14 as a whole. On the other hand, because the spring mount 80 includes arcuate slot 82, some limited resilient angular displacement of spring arm 78 is permitted relative to rotor 24, or in other words, the rotor is permitted to rotate counterclockwise to a limited extent against the return bias force now provided by spring 78. Such counterclockwise displacement of rotor 24 from its "off" position is typically only a few degrees but is effective to provide the requisite electrical contact for "low" speed operation of the wiper motor. When the actuating stem 60 of rotor 24 is released, the rotor instantly returns to its "off" position represented in FIG. 4A.

Referring briefly to the circuit board assembly 13 as illustrated in FIG. 1, a plastic arc suppression pad 86 is affixed to the upper surface of one of the conductive pattern parts 20, as by heat staking to the substrate 21. The arc suppression pad 86 comprises three fingers oriented radially to the axis of rotation of rotor 24 to divide the particular contact pattern part 20 into three electrically identical, but physically separate regions along the path of electrical contact member 32 disposed in opening 30b of the rotor. The pad 86 is of sufficient thickness to cause the contact member 32 to raise away from the contact surface 20 as it crosses a respective finger. Such abrupt separation of a contact member 32 from a contact surface 20 aids in suppressing any electrical arc and further serves to concentrate any arcing on that pattern part. In this latter regard, it will be noted that the relevant pattern part 20 is of relatively large area and better suited for heat absorption than one or more smaller pattern parts 20 which may underlie the other contact member 32 housed in opening 30a.

Figure 5:
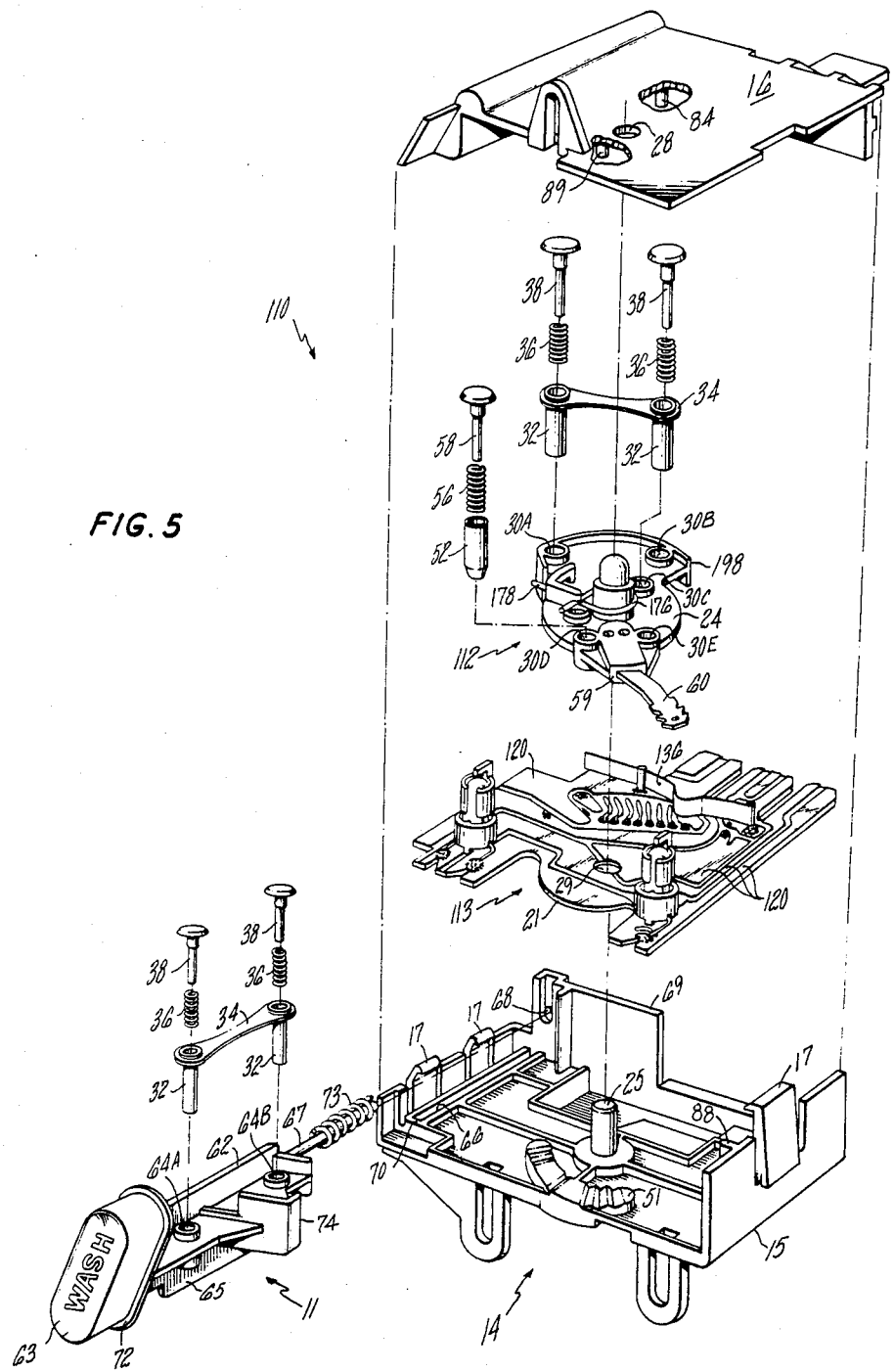
FIG. 5 is an exploded view of another washer/wiper switch including provision for intermittent, or delay, operation.

Referring now to FIG. 5 there is illustrated an exploded view of another embodiment of a washer/wiper switch assembly 110. Washer/wiper switch assembly 110 is identical in many respects to the washer/wiper switch assembly 10 of FIG. 1, and the parts identical in both will be similarly numbered and no further description given. Those aspects of switch assembly 110 which differ will accordingly receive different numerals and will be hereinafter described. Switch assembly 110 affords so-called "delay" or "intermittent" operation of a wiper whereby the delay or interval between successive sweeps of a wiper motor (not shown) may be incrementally varied. The circuitry (not shown) for effecting intermittent operation of the wiper motor is of a known type generally positioned directly at the wiper motor and capable of providing motor-operating pulses at intervals determined by a variable RC time constant. The variability of the RC time constant is provided by a variable resistance, the value of which is determined by the angular positioning of a wiper switch carriage assembly 112 relative to a circuit board assembly 113.

Carriage switch assembly 112 is in most respects identical to the carriage switch assembly 12 of FIG. 1 with the following exceptions. Firstly, the pair of contact members 32 are disposed in openings 30a and 30c of rotor 24. The detent member 52 is positioned in opening 30d of rotor 24. The actuator arm 60 extends from appendage 59 of rotor 24 at a rightward angle rather than a leftward angle. This is conveniently attained by forming the actuator 60 with a dog leg and simply inverting the actuator in the two different embodiments of FIGS. 1 and 5. Further, the torsion spring 176 differs in that its cantilevered arm 178 is shorter than arm 78 of spring 76 in the FIG. 1 embodiment for a reason to be hereinafter described.

The circuit board assembly 113 differs from the assembly 13 in the FIG. 1 embodiment in the following respects. The arc suppression pad 86 of the FIG. 1 embodiment has been omitted. The several individual conductive contact pattern parts 120 disposed on substrate 21 are arranged in different patterns than that of the FIG. 1 embodiment. Most significant in this regard is the generally arcuate array of generally radially-extending contact pattern fingers 120'. The array of contact pattern fingers 120' is arranged to underlie the arcuate path described by the contact member 32 disposed in opening 30a of rotor 24. In that arcuate path of contact with the contact member 32, each of the contact fingers 120' is relatively closely spaced to the next in the array to minimize the space occupied by the collective contact fingers in the array. In the illustrated embodiment, there are seven contact fingers 120' and a larger contact pattern part 120 having a finger-like projection forming the rightmost extreme of the array.

Figure 6:
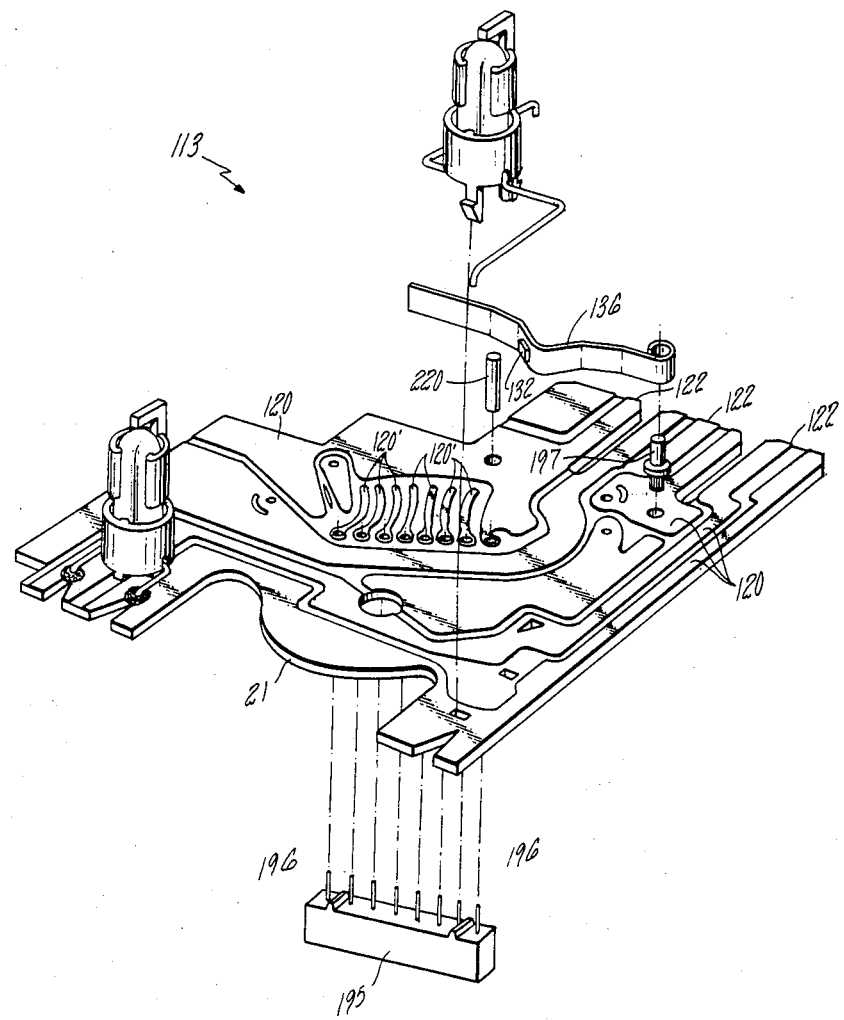
FIG. 6 is an exploded view of the circuit board utilized in the switch of FIG. 5.

An accurately-trimmed resistive element, such as a thick film resistor network 195 has multiple leads 196 which each represent a different resistive tap to the resistor network 195. The resistor network 195 may be conveniently manufactured and trimmed as a discrete element separate from the circuit board of assembly 113. In the embodiment of FIGS. 5 and 6, resistor network 195 is provided with eight leads 196, each lead providing a separate resistive tap and being electrically connected with a respective one of the contact fingers 120' (or 120) forming the aforementioned array. The housing base portion 15 is conveniently provided with recesses such that resistor network 195 may be disposed on the underside of circuit board substrate 21 and the leads 196 feed through the board for connection at its upper surface to the conductive pattern parts 120' and 120. Although the arcuate or circumferential width of the contact fingers 120' in the array is relatively narrow and the spacing therebetween is also narrow in that arcuate region described by the path of the contact 32 in rotor opening 30a, such spacing constraint may be more relaxed in other regions of the circuit board assembly 113 at which the contact members 32 do not make contact. Accordingly, it will be noted that the radially innermost ends of the array of contact fingers 120' are somewhat more widely spaced to accommodate the normally-wider spacing of the leads 196 from resistor network 195.

A further distinction existing on circuit board assembly 113 of the FIGS. 5 and 6 embodiment relative to that of the FIG. 1 embodiment is provided by a further contact 132 which is conductively affixed to and carried by an electrically conductive beam spring 136 having a fixed end electrically connected to one of the contact pattern parts 120, as via a conductive pin 197 mounted in substrate 21. A conductive contact pin 220 is mounted in the substrate 21 in electrical connection with another one of the contact pattern parts 120 and is positioned for selective switching contact with contact 132. Both conductive pins 197 and 220 are connected to the respective contact pattern parts relatively near the connection terminal tabs 122 of assembly 113 to minimize the resistance of the conductive path therebetween. By minimizing the resistance, any voltage drop and resulting heat are also minimized.

The beam spring 136 is formed and oriented such that a cam-following portion thereof is biased radially-inward into engagement with a radially-outward facing camming surface 198 of rotor 24. Camming surface 198 of rotor 24 is seen most clearly in FIGS. 7A–E and is provided by an arcuate section of the outer circumference of the rotor. The radius of camming surface 198 serves to displace beam spring 136 radially outward sufficiently to disengage contact 132 from contact pin 220 until the rotor is rotated sufficiently rightward or clockwise for beam spring 136 to move inward into a radially-inward extending discontinuity in the camming surface which thereby allows engagement of contact members 132 and 220.

Referring to FIG. 7A, the washer/wiper switch assembly 110 is depicted in the configuration providing an "off" electrical condition for both the wash pump motor and the wiper motor, and is generally analogous to FIG. 4A.

FIG. 7B illustrates in phantom the washer switch assembly 11 actuated rearwardly to its limit to energize the pump motor. However, unlike the somewhat analogous situation of FIG. 4B, the wiper carriage assembly 112 is not thereby actuated. Specifically, because the cantilevered arm 178 of torsion spring 176 on rotor 24 has been shortened, it no longer extends into the path of drive member 74 on the wash actuator carriage 62. Thus, the wash motor may be energized without automatically also energizing the wiper motor. It will be appreciated that such difference between the FIG. 1 and FIG. 5 embodiment constitutes a design option.

Referring to FIG. 7C, the rotor 24 is illustrated as having been manually rotated clockwise through a small angle from the "off" position to a position which places it over one of the several contact fingers 120' in the array of delay contacts. The several contact fingers 120' in the array are connected to the leads 196 of resistor 195 in a sequence which provides maximum delay between wiper sweeps at the closest position to the "off" position and minimum delay as rotor 24 is rotated further clockwise to the limit of the array of contacts 120'. The next small incremental clockwise rotation of rotor 24 achieves the position which provides "low" speed operation of the wiper motor. Detenting of the rotor 24 at this "low" speed position is provided by an appropriate detent notch in the contact surface 51 of the housing for engagement by the detent member 52 carried by the rotor in opening 30d.

FIG. 7D illustrates the rotor 24 having been rotated further clockwise to a limit position in which the discontinuity in the rotor camming surface 198 has allowed beam spring 136 to flex radially inwardly and bring contacts 132 and 220 into engagement. Such position electrically corresponds with the "high" speed operation of the wiper motor. Moreover, rotor 24 will be yieldingly held in this position by the detending effect of the cam follower portion of the beam spring 136 acting on the rotor to resist counterclockwise motion. A small stop 88 formed in the base housing 15 also limits further clockwise rotation of rotor 24.

Referring to FIG. 7E, the rotor 24 is shown displaced counterclockwise from its "off" position to provide the "mist" operation referred to above in conjunction with the description of FIG. 4D. As was discussed therein, this position effects temporary "low" speed operation of the wiper motor and is discontinued when the actuator arm 60 is released. Like the FIG. 4D embodiment, the bias for returning the rotor to the "off" position is provided by flexure of the cantilevered arm 178 of torsion spring 176. However, the FIG. 5 embodiment does differ from the FIG. 1 embodiment in that because the length of cantilevered spring arm 178 has been shortened, it can no longer utilize the drive member 74 of washer switch 11 as a stop member. Accordingly, a stop rod 89 depends, like stop rod 84, from the undersurface of cover portion 16 and is positioned to engage and limit counterclockwise displacement of the shortened spring arm 178 to provide the requisite return bias to the rotor 24.

Although this invention has been shown and described with respect to detailed embodiments thereof, it will be understood by those skilled in the art that various changes in form and detail thereof may be made without departing from the spirit and scope of the claimed invention.

Having thus described a typical embodiment of my invention, that which is claimed as new and desired to secure by letters Patent of the United States is:

1. An electrical switch comprising:
   a housing;
   a carriage movable in said housing between first and second positions;
   electrical contact means mounted on and moving with said carriage;
   a conductive contact surface fixed in said housing for engagement by said contact means;
   first actuating means, said actuating means being manually actuatable from a first to a second position;
   drive means carried by said first actuating means along a path;
   resilient reaction means affixed to said carriage and extending into said path for engagement with and displacement by said drive means; and
   said carriage being displaced from said first to said second position by said displacement of said reaction means.

2. The switch of claim 1 wherein said reaction means is the centilevered arm of a torsion spring.

3. The switch of claim 2 wherein said carriage is rotatably mounted for rotation between said first and said second positions.

4. The switch of claim 1 wherein said drive means is a rigid appendage of said first actuating means.

5. The switch of claim 4 wherein said first actuating means is biased to said first position.

6. The switch of claim 1 wherein said carriage is further movable between said first and a third position, said first position being intermediate said second and said third positions, and including handle means connected to said carriage for manually actuating said carriage from said first at least to said third position, stop means, said stop means being positioned to engage said reaction means as said carriage is manually moved from said first toward said third position, and said reaction means resiliently yielding thereby to bias said carriage to return to said first position from said third position when said handle means is released.

7. The switch of claim 6 wherein said drive means is also said stop means.

8. The switch of claim 7 wherein said first actuating means is biased to its said first position and includes a rigid appendage forming said drive means, and said reaction means comprises the cantilevered arm of a torsion spring.

9. The switch of claim 8 including detenting means cooperatively associated with said carriage and said housing for yieldably maintaining said carriage at the respective said first and second positions.

10. The switch of claim 8 wherein said carriage is rotatably mounted for rotation in opposite directions between said first, said second and said third positions.

11. The switch of claim 10 wherein said first actuating means is linearly reciprocable between its respective said first and said second positions.

12. The switch of claim 11, said switch being adapted to control energization of a wiper motor between "off" and "on" conditions, said contact surface and said contact means being operative in said carriage first position to place a said wiper motor in the "off" condition and in both of said second and said third positions of said carriage to place a said wiper motor in the "on" condition.

13. The switch of claim 12, said switch being adapted to also control energization of a washer motor between "off" and "on" conditions, said first actuating means including other contact means mounted thereon and moving therewith, said contact surface also being positioned and structured for engagement by said other contact means, said contact surface and said other contact means being operative in said first position of said first actuating means to place a said washer motor in the "off" condition and in said second position of said first actuating means to place a said washer motor in the "on" condition.

14. The switch of claim 5, said switch being adapted to control energization of both a wiper motor and a washer motor between respective "off" and "on" conditions, said contact surface and said contact means being operative in said carriage first position to place a said wiper motor in the "off" condition and said second position of said carriage to place a said wiper motor in the "on" condition, and said first actuating means including other contact means mounted thereon and moving therewith, said contact surface also being positioned and structured for engagement by said other contact means, said contact surface and said other contact means being operative in said first position of said first actuating means to place a said washer motor in the "off" condition and in said second position of said first actuating means to place a said washer motor in the "on" condition.

* * * * *